US010160367B2

(12) United States Patent
Van Mill (10) Patent No.: US 10,160,367 B2
(45) Date of Patent: Dec. 25, 2018

(54) GRAIN CART WITH ROTATABLE FOLDING AUGER ASSEMBLY

(71) Applicant: Unverferth Manufacturing Company, Inc., Kalida, OH (US)

(72) Inventor: Michael D. Van Mill, Shell Rock, IA (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 0 days.

(21) Appl. No.: 15/392,321

(22) Filed: Dec. 28, 2016

(65) Prior Publication Data

US 2017/0182921 A1 Jun. 29, 2017

Related U.S. Application Data

(60) Provisional application No. 62/271,879, filed on Dec. 28, 2015.

(51) Int. Cl.
*A01D 90/10* (2006.01)
*B60P 1/42* (2006.01)
*B65G 33/14* (2006.01)

(52) U.S. Cl.
CPC .............. *B60P 1/42* (2013.01); *B65G 33/14* (2013.01)

(58) Field of Classification Search
CPC .......... A01D 90/10; B60P 1/42; B65G 33/14; B65G 33/20

(Continued)

(56) References Cited

U.S. PATENT DOCUMENTS 796,477 A 8/1905 Wallace
1,689,963 A 10/1928 Pelton
(Continued)

OTHER PUBLICATIONS

J&M Mfg. Co., Inc.'s Initial Invalidity Contentions dated Sep. 18, 2015, Unverferth Mfg. Co., Inc. v. J&M Mfg. Co., Inc., No. 3:15-cv-01045-JZ, N.D. Ohio, 85 pages.
(Continued)

*Primary Examiner* — Douglas A Hess
(74) *Attorney, Agent, or Firm* — Rothwell, Figg, Ernst & Manbeck P.C.

(57) ABSTRACT

According to a first aspect, a grain cart is provided. The grain cart includes a rolling frame; and a bin mounted to the frame and having one or more walls defining a space for storing an agricultural product. The grain cart also includes a folding auger assembly having an upper auger portion with a first longitudinal axis and a lower auger portion with a second longitudinal axis. The upper auger portion further has an upper auger, an upper auger housing, and a discharge spout coupled to a top end of the upper auger housing. The lower auger portion further has a lower auger and lower auger housing. A bottom end of the lower auger housing is coupled to the bin and a top end of the lower auger housing is coupled to a bottom end of the upper auger housing, such that the lower auger and upper auger are operable to convey the agricultural product from the bin to the discharge spout. The auger assembly is foldable about a folding axis between a stored position and an operating position, such that in the stored position, the upper auger portion is folded relative to the lower auger portion so that the upper auger portion extends along a wall of the bin, and in said operating position, the upper auger portion extends upwardly from the lower auger portion. The auger assembly is rotatable in the operating position about the second longitudinal axis.

19 Claims, 8 Drawing Sheets

(58) Field of Classification Search
USPC ..................... 198/318, 550.1, 550.2, 668
See application file for complete search history.

(56) References Cited

U.S. PATENT DOCUMENTS

| | | | |
|---|---|---|---|
| 2,056,243 A | 10/1936 | Anderson | |
| 2,772,767 A | 12/1956 | Seifert | |
| 2,783,907 A | 3/1957 | Hudgins | |
| 2,830,695 A | 4/1958 | Fennimore et al. | |
| 3,010,295 A | 11/1961 | Kline | |
| 3,014,575 A | 12/1961 | Kline | |
| 3,016,128 A | 1/1962 | Hacker | |
| 3,175,676 A | 3/1965 | Vander Schaaf | |
| 3,241,657 A | 3/1966 | Buschbom | |
| 3,252,562 A | 5/1966 | Brembeck | |
| 3,283,925 A | 11/1966 | Gutekunst | |
| 3,391,779 A | 7/1968 | Scheel et al. | |
| 3,435,941 A | 4/1969 | Mayrath | |
| 3,560,133 A | 2/1971 | Ryczek | |
| 3,633,812 A | 2/1972 | Ryczek | |
| 3,670,913 A | 6/1972 | Reaves | |
| 3,773,164 A * | 11/1973 | Bradley ............... | B65G 41/002 198/592 |
| 3,860,010 A | 1/1975 | Anderson et al. | |
| 3,938,684 A | 2/1976 | Quoiffy et al. | |
| 4,029,228 A | 6/1977 | Shaver | |
| 4,093,087 A | 6/1978 | DeCoene | |
| 4,433,946 A | 2/1984 | Christianson et al. | |
| 4,619,577 A | 10/1986 | Swanson | |
| 4,662,812 A | 5/1987 | Busboom et al. | |
| 4,714,398 A | 12/1987 | Rohwedder | |
| 4,923,358 A * | 5/1990 | Van Mill ............... | B60P 1/42 198/532 |
| 4,989,716 A | 2/1991 | Stuckey | |
| 5,013,208 A | 5/1991 | Grieshop | |
| 5,129,502 A | 7/1992 | Justice | |
| 5,340,265 A | 8/1994 | Grieshop | |
| 5,468,113 A * | 11/1995 | Davis ............... | B60P 1/40 198/550.1 |
| 5,516,253 A * | 5/1996 | Linscheid ............... | B60P 1/42 198/313 |
| 5,538,388 A * | 7/1996 | Bergkamp ............... | B60P 1/42 414/523 |
| 5,655,872 A * | 8/1997 | Plotkin ............... | B60P 1/40 198/313 |
| 5,733,094 A * | 3/1998 | Bergkamp ............... | B60P 1/40 414/502 |
| 6,248,015 B1 | 6/2001 | Rayfield et al. | |
| 6,261,050 B1 * | 7/2001 | Kuhns ............... | B60P 1/42 198/671 |
| 6,296,435 B1 | 10/2001 | Wood et al. | |
| 6,497,546 B2 | 12/2002 | Wood et al. | |
| 6,711,884 B1 | 3/2004 | McLeod et al. | |
| 6,767,174 B2 | 7/2004 | Cresswell | |
| 6,908,380 B2 * | 6/2005 | Silver ............... | A01D 41/1217 141/198 |
| 7,090,066 B2 | 8/2006 | Kirsch | |
| 7,134,830 B2 | 11/2006 | Wood | |
| 7,267,519 B2 | 9/2007 | Cresswell et al. | |
| 7,553,228 B2 | 6/2009 | Dillon | |
| 8,047,757 B1 | 11/2011 | Wood | |
| 8,585,343 B2 | 11/2013 | Wood | |
| 9,039,340 B2 * | 5/2015 | Van Mill ............... | B60P 1/42 414/526 |
| 9,216,681 B1 * | 12/2015 | Van Mill ............... | B60P 1/42 |
| 9,272,653 B2 * | 3/2016 | Van Mill ............... | B60P 1/42 |
| 9,706,713 B2 * | 7/2017 | Van Mill ............... | A01D 90/10 |
| 9,723,789 B2 * | 8/2017 | Van Mill ............... | A01D 90/10 |
| 9,848,536 B2 * | 12/2017 | Van Mill ............... | A01D 90/10 |
| 2003/0175102 A1 | 9/2003 | Cresswell | |
| 2004/0184905 A1 | 9/2004 | Kinzenbaw et al. | |
| 2008/0210145 A1 | 9/2008 | Petersen et al. | |
| 2015/0203019 A1 | 7/2015 | Kinzenbaw | |
| 2017/0055454 A1 * | 3/2017 | Michael et al. | |

OTHER PUBLICATIONS

European Search Report and European Search Opinion Application No. EP10741606, dated Nov. 6, 2013, 7 pages.
Australian Examination Report in Application No. 2010213947, dated Apr. 15, 2014, 4 pages.
Parker, "838/938 Parker Grain Carts", brochure, 2005, 4 pages.
Par-Kan, "Par-Kan GW 200 Grain Weigh Wagon", webpage (http://www.par-kan.com/grain-weigh.html), May 13, 2006, 1 page.
Brent, "Brent Avalance 94 Series Grain Cart" brochure, 2007, 6 pages.
Parker, "Models 838 & 839 Grain Cart Operator's Manuel and Parts List", Dec. 2014, 4 pages.
Unverferth, "Corner Auger Grain Carts Operator's Manual Parts Catalog: Model 920 & 970 Corner Auger Grain Cart", Jul. 2014, 3 pages.
Unverferth Mfg. Co., Inc.'s Validity and Enforceability Contentions dated Oct. 8, 2015, Unverferth Mfg. Co., Inc. v. J&M Mfg. Co., Inc., C.A. No. 3:15 cv-01045-JZ, N.D. Ohio, 23 pages.
Office Action dated Oct. 6, 2015 in Canadian Application No. 2,752,207, 3 pages.

* cited by examiner

GRAIN CART WITH ROTATABLE FOLDING AUGER ASSEMBLY

CROSS-REFERENCE TO RELATED APPLICATIONS

This application claims priority to U.S. Provisional Application No. 62/271,879, entitled "Grain cart with rotatable folding auger assembly," filed on Dec. 28, 2015, the disclosure of which is incorporated here in its entirety.

BACKGROUND OF THE INVENTION

Field of the Invention

The present invention relates generally to grain carts and, more particularly, to a grain cart with a folding auger assembly that is rotatable to provide adjustable reach.

Description of the Related Art

Existing grain carts lack a folding auger assembly that is rotatable to provide adjustable reach. The present application addresses this problem, which results in a number of advantages which will be apparent from the present disclosure.

SUMMARY OF THE INVENTION

According to a first aspect, a grain cart is provided. The grain cart includes a rolling frame; and a bin mounted to the frame and having one or more walls defining a space for storing an agricultural product. The grain cart also includes a folding auger assembly having an upper auger portion with a first longitudinal axis and a lower auger portion with a second longitudinal axis. The upper auger portion further has an upper auger, an upper auger housing, and a discharge spout coupled to a top end of the upper auger housing. The lower auger portion further has a lower auger and lower auger housing. A bottom end of the lower auger housing is coupled to the bin and a top end of the lower auger housing is coupled to a bottom end of the upper auger housing, such that the lower auger and upper auger are operable to convey the agricultural product from the bin to the discharge spout. The auger assembly is foldable about a folding axis between a stored position and an operating position, such that in the stored position, the upper auger portion is folded relative to the lower auger portion so that the upper auger portion extends along a wall of the bin, and in said operating position, the upper auger portion extends upwardly from the lower auger portion. The auger assembly is rotatable in the operating position about the second longitudinal axis.

In some embodiments, at least one of the top end of the lower auger housing, relative to the second longitudinal axis, and the bottom end of the upper auger housing, relative to the first longitudinal axis, may be orientated at an oblique angle when in the operating position. In some embodiments the oblique angle may be from 60° to 120°, or from 80° to 85°, or may be about 83°.

In some embodiments, the first longitudinal axis may be tilted relative to the second longitudinal axis, when in the operating position. In some embodiments, the upper auger portion may be tilted laterally outward relative to the lower auger portion, when in the operating position.

In some embodiments, rotating the auger assembly in the operating position about the second longitudinal axis may be operable to cause the discharge spout to move along a circular path or arc with a radius equal to an angular offset of the discharge spout relative to the second longitudinal axis.

In some embodiments, a reach of the discharge spout may be adjusted by rotating the auger assembly in the operating position about the second longitudinal axis. In some embodiments, an amount of said reach adjustment may be at least one of 36 inches in a vertical direction, 18 inches in a lateral direction, and 12 inches in a forward direction.

In some embodiments, the grain cart further includes a first rotation mount coupled to the frame; and a second rotation mount coupled to the frame and spaced laterally from the first rotation mount along the second longitudinal axis. The grain cart further includes a rotational actuator for rotating the lower auger assembly coupled to the lower auger housing at one end and to a support member of the frame at another end. The rotational actuator may be operable to cause the lower auger assembly to rotate in the operating position about the second longitudinal axis such that the first rotation mount and the second rotation mount remain fixed as the lower auger assembly rotates. In some embodiments, the lower auger housing further includes a circular flange near the bottom end of said lower auger housing and protruding radially outward from and extending around the lower auger housing, and a circular band near the top end of the lower auger housing and protruding radially outward from and extending around the lower auger housing. In these embodiments, the circular flange may be coupled to the first rotation mount and the circular band may be coupled to the second rotation mount. In some embodiments, the second rotation mount includes a pair of spaced rings defining an annular space therebetween configured to receive the circular band. The pair of spaced rings may be connected to at least one of the bin and the frame by the support member. In some embodiments, the rotational actuator may be oriented generally perpendicular to the second longitudinal axis, and may be connected between the lower auger housing and the support member. The support member extends upwardly from the frame to the first rotation mount.

In some embodiments, the auger assembly is rotatable about the second longitudinal axis between a plurality of positions in which the auger assembly is operable.

According to a second aspect a method of using a grain cart to unload material into a receptacle is provided. The method includes providing a grain cart according to exemplary embodiments of the present invention. The method further includes unfolding the auger assembly into the operating position, so that the discharge spout is at a first location relative to the receptacle. The method further includes rotating the auger assembly to adjust a reach of the upper auger portion to position the discharge spout at a second location relative to the receptacle different from the first location.

BRIEF DESCRIPTION OF THE DRAWINGS

An exemplary embodiment of the present invention will be described with reference to the attached figures, in which.

DETAILED DESCRIPTION OF THE PRESENT INVENTION

Figure 1:
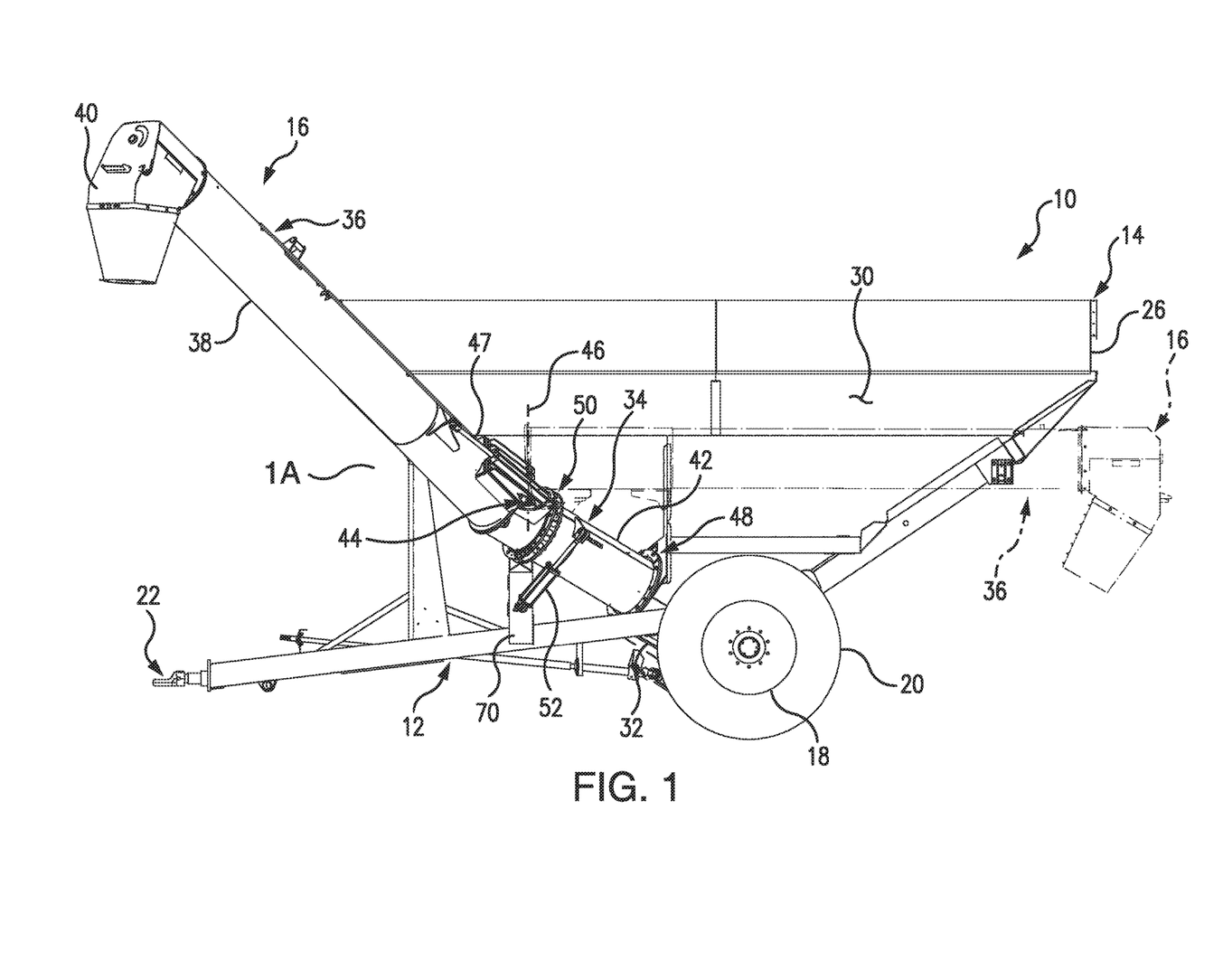
FIG. 1 is a side view of a grain cart according to an embodiment of the present invention.
Figure 1A:
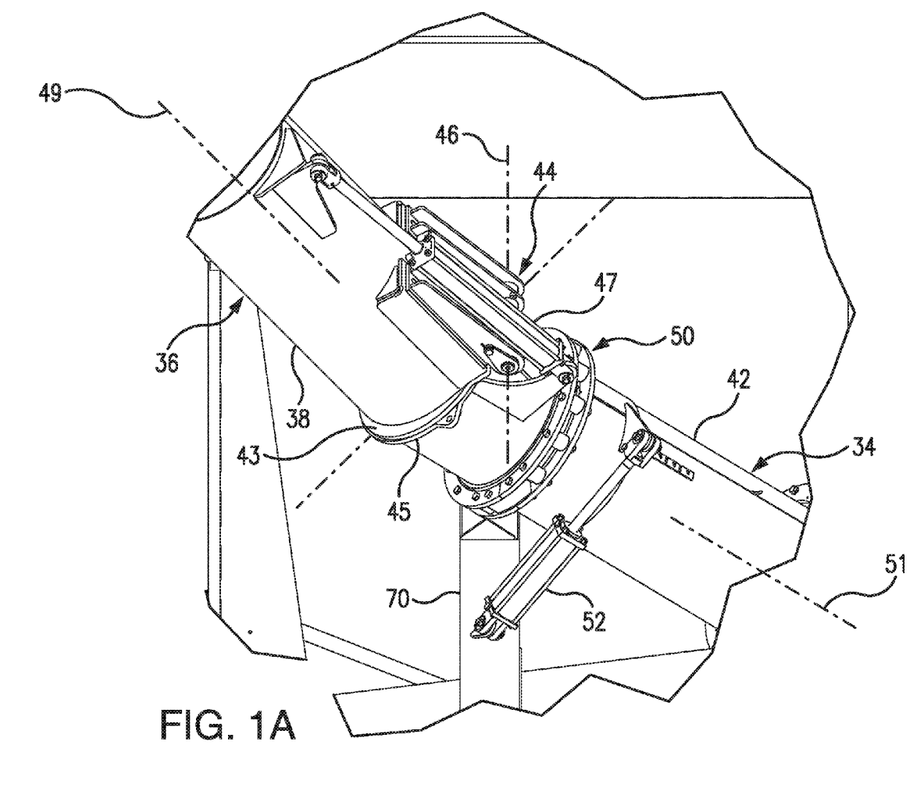
FIG. 1A is an enlarged detail view of a portion of an auger assembly for a grain cart according to an embodiment of the present invention.
Figure 2:
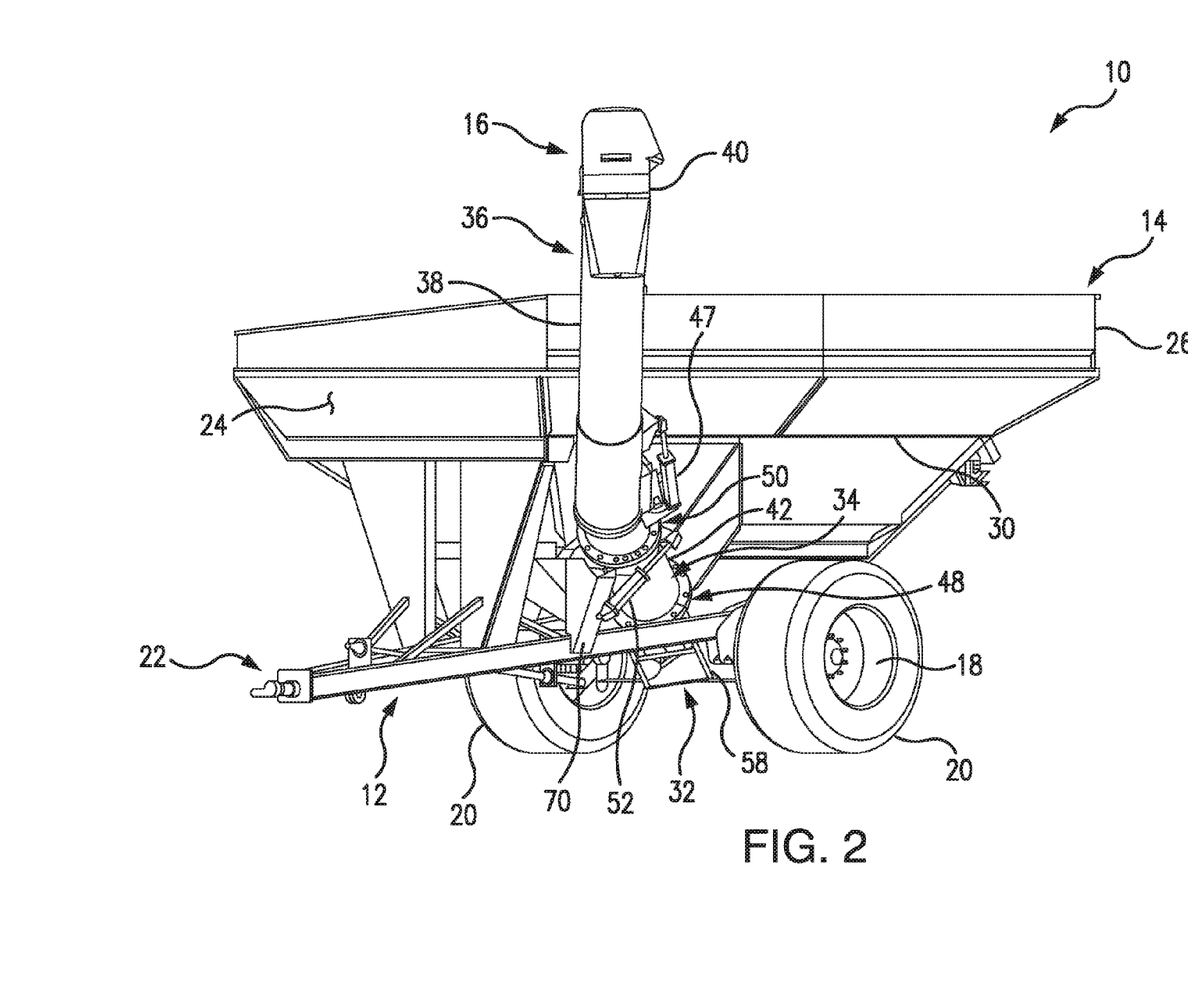
FIG. 2 is a perspective view of the grain cart shown in FIG. 1, taken from the front left corner of the cart.

Referring now to FIGS. 1, 1A and 2, a grain cart 10 according to an embodiment of the present invention includes a rolling frame 12 for attachment behind a tractor, a bin 14 mounted on the frame for storing a quantity of grain, and an auger assembly 16 for unloading grain from the bin. In the embodiment shown in FIGS. 1 and 2, the frame 12 is supported for rolling movement on a set of wheels 18 with tires 20. The frame 12 also includes a hitch 22 that extends forwardly from the frame 12 for attachment to a tractor. In the embodiment shown in FIGS. 1 and 2, the bin 14 includes a front wall 24, a rear wall 26, and right and left side walls 28 (shown in FIG. 4) and 30 defining a space for storing grain. The grain cart 10 may also include a gate or door near a bottom of the bin 14 that separates the grain storage space from a sump area 32.

The auger assembly 16 includes a lower auger portion 34 and an upper auger portion 36. The upper auger portion 36 includes a tubular upper housing 38 and an upper auger (not shown) with helical flights rotatably disposed within the upper housing. The upper auger portion 36 also includes a discharge spout 40 at a top end of the upper housing. The lower auger portion 34 includes a tubular lower housing 42 and a lower auger (not shown) with helical flights rotatably disposed within the lower housing. The lower auger portion 34 extends upwardly, forwardly, and laterally outwardly from the sump area 32 to connect with a bottom end of the upper auger portion 36 proximate a front left corner of the bin 14 (e.g., proximate the intersection of the front and left walls of the bin).

The upper and lower housings 38 and 42 are connected by a hinge assembly 44 that defines a pivot axis 46 about which the upper auger portion 36 can be pivoted between an operating position and a transport position. In an embodiment, folding of the upper auger portion 36 can be effectuated by a fold actuator 47 connected between the upper auger portion and the lower auger portion 34, the frame 12, and/or the bin 14. In the embodiment shown, the fold actuator 47 is a hydraulic cylinder connected between the upper and lower auger portions 34 and 36. In the operating position, shown in FIGS. 1 and 2, the bottom end of the upper housing 38 abuts a top end of the lower housing 42 so that the upper auger portion 36 extends upwardly from the lower auger portion 34 and grain can be conveyed from the sump 32 to the discharge spout 40 via rotation of the augers. In the transport position (shown by broken lines in FIG. 1), the upper auger portion 36 of auger assembly 16 is folded relative to the lower auger portion 34 of the auger assembly so that the upper auger portion extends along a wall of the bin 14, e.g., such that the upper auger portion extends rearwardly from the lower auger portion along a side wall of the bin for easier transport and storage.

In certain embodiments of the present invention, at least one of the top end of the lower auger housing 42 and the bottom end of the upper auger housing 38 may be oriented at an oblique angle relative to a longitudinal axis of the respective housing. In the embodiment shown in FIGS. 1 and 2, the bottom end 43 (shown in FIG. 1A) of the upper housing 38 is oriented at an oblique angle (e.g., 82.75°) relative to the longitudinal axis 49 (shown in FIG. 1A) of the upper housing, and the top end 45 (shown in FIG. 1A) of the lower housing 42 is oriented at an oblique angle (e.g., 82.75°) relative to the longitudinal axis 51 (shown in FIG. 1A) of the lower housing. Thus, when the upper auger portion 36 is in the operating position, the longitudinal axis of the upper auger portion (the "upper longitudinal axis") may be tilted or oriented at an angle relative to the longitudinal axis of the lower auger portion 34 (the "lower longitudinal axis"). In the embodiment shown, the upper auger portion 36 is tilted laterally outward relative to the lower auger portion 34 in the operating position. That is, the upper longitudinal axis extends laterally outward at an angle relative to the lower longitudinal axis. The upper longitudinal axis may also be tilted upwardly or downwardly relative to the lower longitudinal axis. In an embodiment, the upper longitudinal axis is tilted laterally outward (when viewed from above) and upwardly (when viewed from the side), relative to the lower longitudinal axis.

In embodiments of the present invention, the auger assembly 16 may be rotatable about the lower longitudinal axis when the upper auger portion 36 is in the operating position. In some embodiments, auger assembly 16 may be rotatable about the lower longitudinal axis between two or more positions in which the auger assembly 16 is operable. Because the upper auger portion 36 is tilted relative to the lower auger portion 34, the discharge spout at the top end of the upper auger portion is laterally offset from the longitudinal axis of the lower auger portion. Thus, rotating the auger assembly 16 about the lower longitudinal axis causes the discharge spout at the top end of the upper auger portion 36 to move along a circular path or arc with a radius equal to an angular offset of the discharge spout relative the lower longitudinal axis. As the discharge spout moves about the circular path, the position of the discharge spout relative to (a) the ground (i.e., the vertical reach or height of the spout), (b) the side of the bin (i.e., lateral reach of the spout), and (c) the front of the bin (i.e., forward reach of the spout) changes. Thus, it is possible to adjust the reach of the auger assembly 16 (i.e., the vertical, lateral, and/or forward reach of the spout) by rotating the auger assembly about the lower longitudinal axis. The amount of reach adjustment can be predetermined by combining a desired degree of tilt and a specific amount of rotation. In an embodiment, the amount of tilt can be as much as 20° or higher. For example, if the degree of tilt is 14.5° (in the plane defined by the upper and lower longitudinal axes) and the amount of rotation may be 45°, then for a side folding upper auger portion 36 of conventional length (e.g., about 207 inches), a cart according to the present invention would have a reach adjustment of about 36 inches in a vertical direction, about 18 inches in a lateral direction, and about 12 inches in a forward direction. Other examples of suitable tilt angles include 17.5° and 20.5°.

Figure 3:
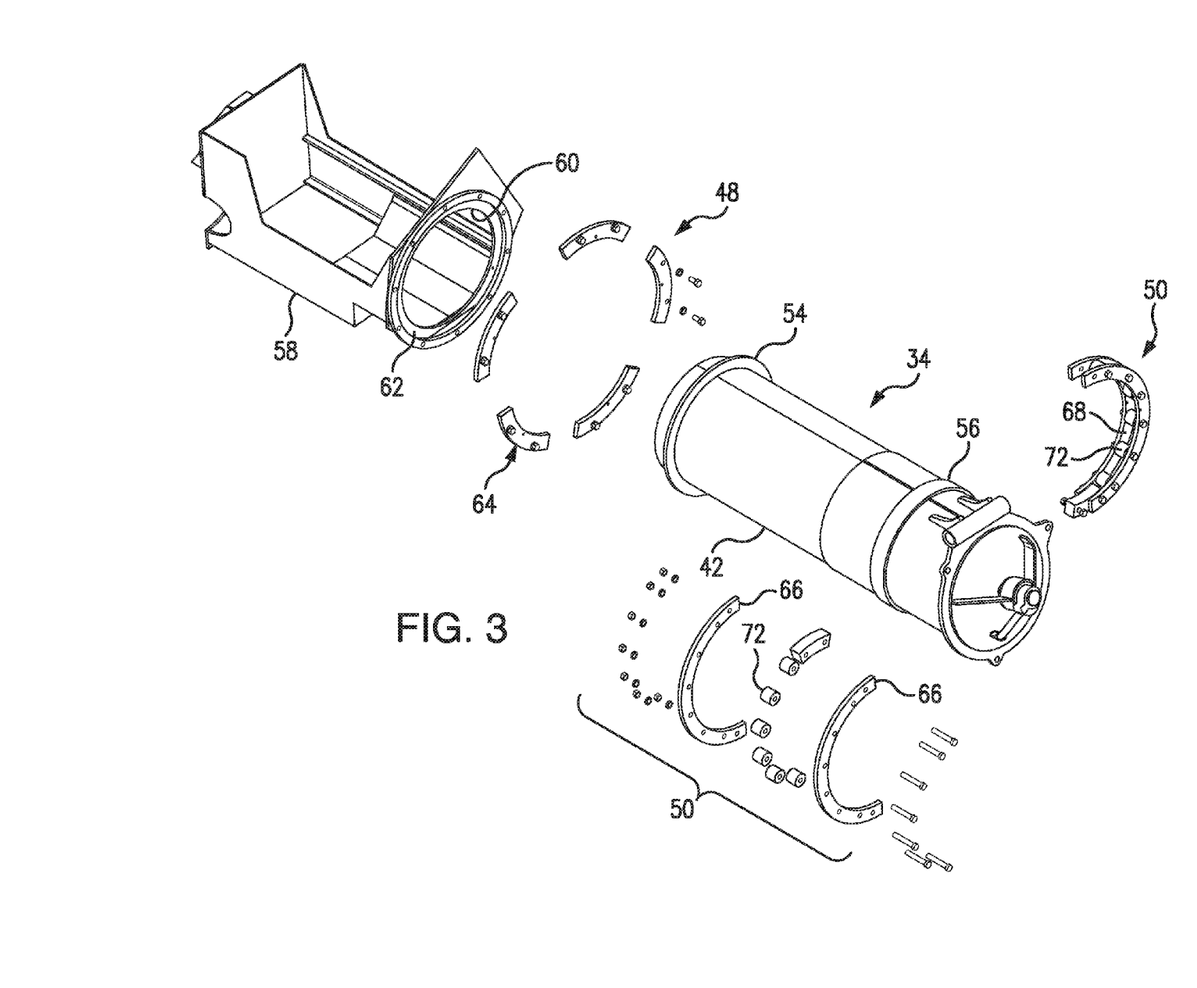
FIG. 3 is an exploded perspective view of a lower auger assembly and rotation mounts for a grain cart according to an embodiment of the present invention.

In the embodiment shown in FIGS. 1 and 2, rotation of the auger assembly 16 is accomplished by mounting the lower auger assembly 34 for rotation about its longitudinal axis on first and second rotation mounts 48 and 50, and rotating the lower auger assembly by use of an actuator 52. FIG. 3 shows a lower auger portion 34 and rotation mounts according to an embodiment of the present invention. In this embodiment, the lower auger housing 42 includes a circular flange 54 near a bottom end of the housing and a circular band 56 near a top of the housing. Flange 54 and band 56 each protrude radially outward from, and extend around, the outer circumference of the housing. Band 56 may be spaced from the top of the housing below the hinge assembly. In the embodiment shown, a lower rotation mount 48 couples the flange 54 with a junction box 58 at sump 32, and an upper rotation mount 50 couples the upper flange 56 with the frame 12. In the embodiment shown, the lower auger housing 42 extends through an opening 60 in the junction box and the flange 54 abuts a front wall or portion 62 of the junction box around the opening. Lower rotation mount 48 includes a ring 64 that attaches to the junction box (e.g., using fasteners such as bolts) around the flange 54 and extends radially inward above the flange so that the flange is able to rotate in a space between the junction box and the ring. In the embodiment shown, the ring may be made up of multiple ring segments which are secured to the junction box by fasteners, although a single circular ring could be used. In an embodiment, the space between the ring and the junction box may be greased to facilitate rotation of the flange in the lower mount. In an embodiment, an anti-friction washer or lining made of a slick material, such as nylon or polytetrafluoroethylene, may be used to reduce friction between the flange and the mount.

The upper mount 50 includes a pair of spaced rings 66 defining an annular space 68 therebetween configured to receive circular band 56. A plurality of roller bearings 72 are disposed within the annular space between the rings to facilitate rotation of the lower auger portion 34. The roller bearings 72 may be secured between the rings by fasteners, such as bolts, pins, rivets, or any other suitable fasteners. The upper rings 66 may be connected to the bin 14 and/or frame 12 via one or more support members 70, so that the lower auger portion 34 may be maintained in a fixed orientation as it is rotated. In the embodiment shown, the rings 66 are connected to the frame 12 by an upright support member 70. The support members may be secured to the rings and to the bin 14 and/or frame 12 via fasteners, such as bolts, and/or by welding, or any other suitable means of attachment.

In the embodiment shown in FIGS. 1, 1A, and 2, the rotation actuator 52 is shown as a hydraulic cylinder connected between the lower auger assembly 34 and the frame 12. In an embodiment, the actuator 52 may be oriented generally perpendicular to the longitudinal axis 51 of the lower auger portion 34. In an embodiment, the actuator 52 may be connected between the lower auger housing and a support member 70 extending upwardly from the frame 12 to the lower rotational mount 48.

Figure 4:
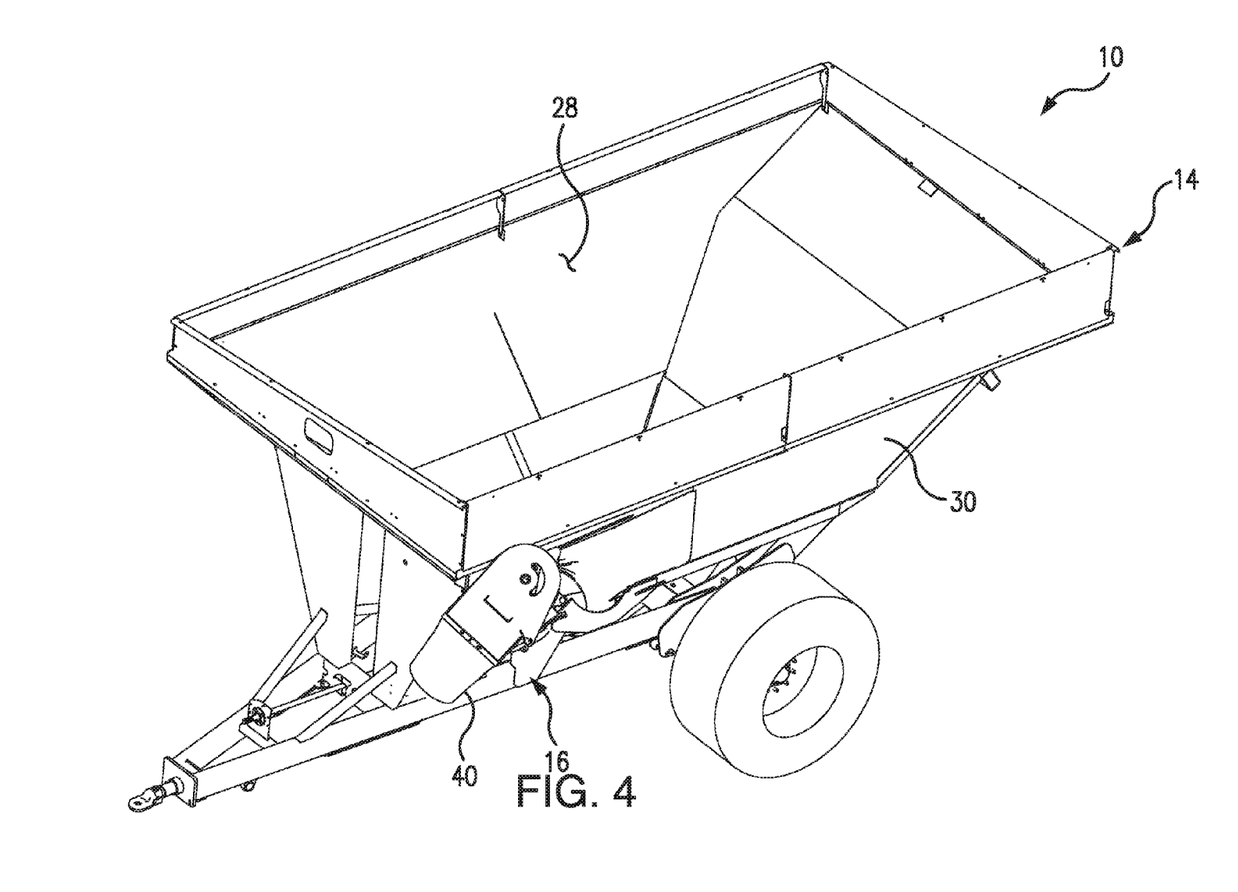
FIG. 4 is a perspective view of the grain cart shown in FIGS. 1 and 2, with the auger assembly in a non-rotated position.
Figure 5:
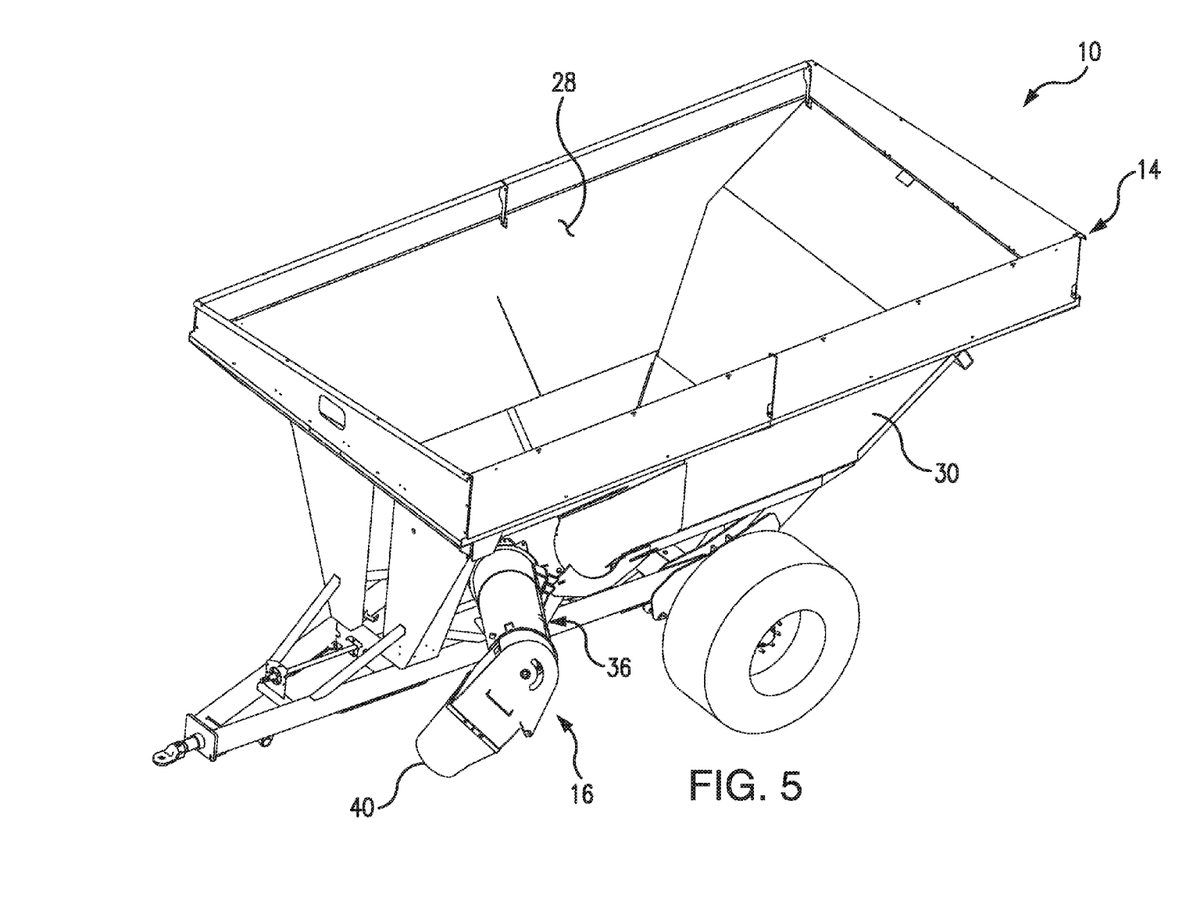
FIG. 5 is a perspective view of the grain cart shown in FIGS. 1 and 2, with the auger assembly in a rotated position.

FIGS. 4 and 5 are perspective views of a grain cart 10 according to an embodiment of the present invention showing two different rotational orientations of the upper auger portion 36 in the operating position. In FIG. 4, the upper auger portion 36 is shown in an initial or unrotated orientation, i.e., an orientation initially assumed when the upper auger portion is pivoted from the transport position to the operating position. In an embodiment, the pivot axis 46 of the hinge assembly 44 in the nominal rotational orientation may be generally vertical (e.g., within a few degrees of vertical) when viewed from the side of the cart. The pivot axis 46 may also be generally vertical when viewed from the front of the cart, or the pivot axis may be tilted from vertical towards or away from the cart 10 when viewed from the front of the cart. The discharge spout 40 may also be at its highest point (i.e., the apex of the arc) in the nominal operating position to provide maximum clearance for nearby vehicles and objects when folding and unfolding the upper auger portion 36. In an embodiment, the rotational actuator 52 may be fully extended when the upper auger portion 36 is in the unrotated operating position orientation. In other words, the unrotated operating position orientation may correspond to 0 degrees of rotation of the auger assembly 16. Alternatively, the rotational actuator 52 may be partially retracted in the unrotated operating position orientation such that the auger assembly 16 may be rotated clockwise or counterclockwise (looking down the lower longitudinal axis) from the unrotated orientation by retraction or extension of the actuator 52, respectively. In FIG. 5, the upper auger portion 36 is shown in a rotated orientation, i.e., an orientation resulting from rotation of the auger assembly 16 about the lower longitudinal axis. In the embodiment shown, the auger assembly 16 in FIG. 5 is rotated counterclockwise (looking down the lower longitudinal axis) relative to the auger assembly in FIG. 4. In an embodiment, the maximum amount of rotation may be up to 180° (i.e., 0°-180°). According to one embodiment, the maximum amount of rotation may be up to 45°.

Figure 6A:
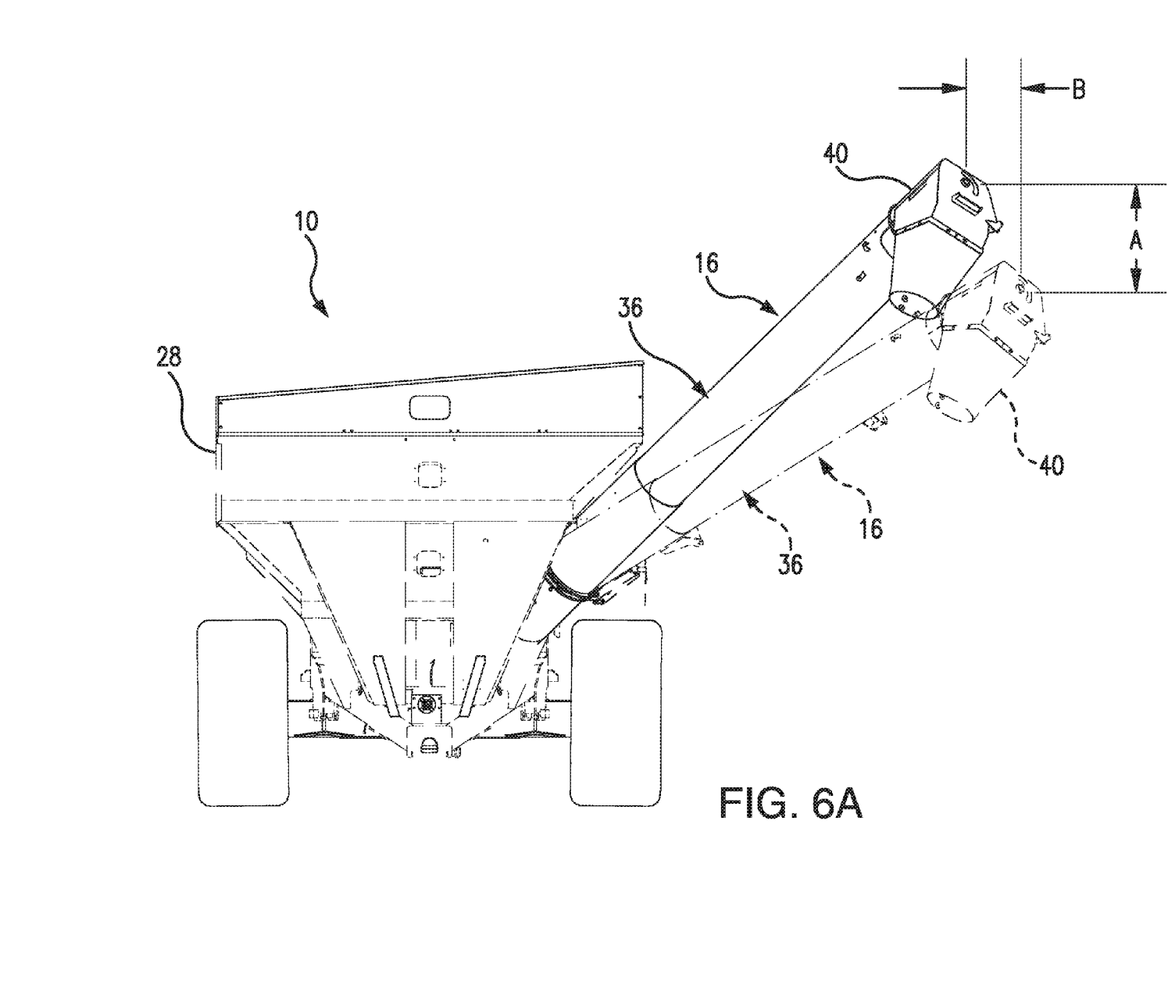
FIGS. 6A and 6B are front and left side views of the grain cart shown in FIGS. 4 and 5, with non-rotated position shown by solid lines and rotated position shown by broken lines.
Figure 6B:
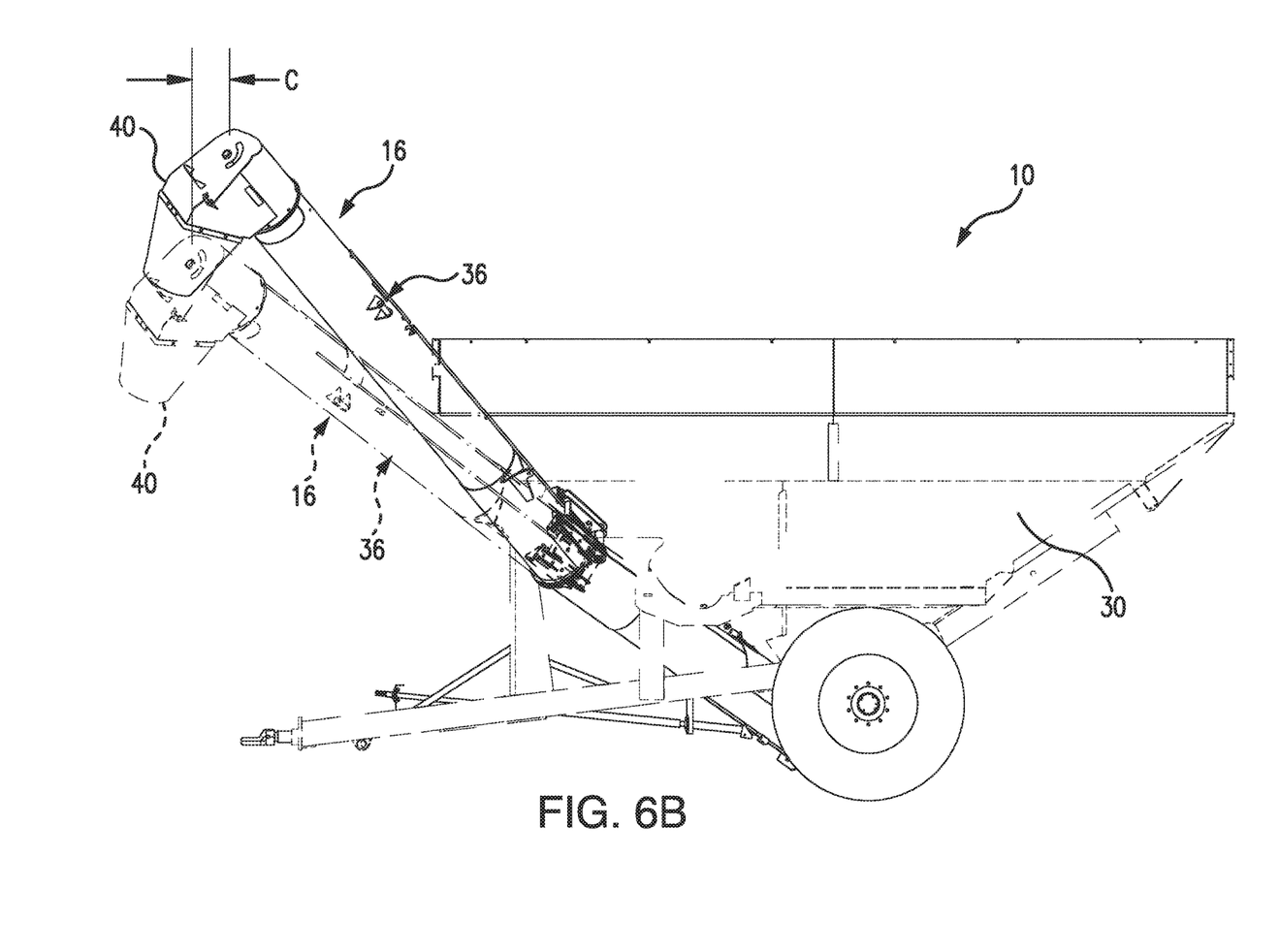

FIGS. 6A and 6B show front and side views of a grain cart 10 according to an embodiment of the present invention with the upper auger portion 36 in different operating position orientations. In both figures, the solid line indicates the unrotated orientation and the broken line indicates a rotated orientation. The dimension A represents the difference in vertical reach between the unrotated orientation and the rotated orientation. The dimension B represents the difference in lateral reach between the unrotated orientation and the rotated orientation. The dimension C represents the difference in forward reach between the unrotated orientation and the rotated orientation. In an exemplary embodiment, A may be about 36 inches, B may be about 18 inches, and C may be about 12 inches.

In use, a grain cart 10 according to embodiments of the present invention may be attached behind a tractor using hitch 22. The grain cart 10 may also be connected to the power-take-off (PTO) and hydraulic manifold on the tractor to operate the auger assembly 16 and/or the various actuators (e.g., elements 47 and 52) on the cart. With the upper auger portion 36 in a folded transport position along a wall of the bin 14, the grain cart 10 may be towed behind the tractor for transport and to receive an agricultural product, such as grain, from a combine in a field. When it is desired to unload the bin 14, the grain cart 10 may be towed by the tractor to a truck on a road alongside the field, or some other receptacle. Prior to or after pulling the cart 10 alongside the receptacle, the operator of the tractor may unfold the upper auger portion 36 from the transport position to the operating position using the fold actuator 47. When the upper auger portion 36 is in the operating position, the operator in the tractor may rotate the auger assembly 16 to adjust the reach of the upper auger portion to position the discharge spout 40 at a desired location relative to the receptacle. For example, in windy conditions, if the receptacle is significantly lower than the discharge spout 40 in an unrotated orientation, the operator may rotate the auger assembly 16 by retracting the actuator 52 to cause the vertical reach of the upper auger portion 36 to be reduced an appropriate amount to decrease the gap between the spout and receptacle. To unload the agricultural product from the bin 14, the door to the sump 32 is opened, and the augers rotated, to convey the agricultural product from the sump to the discharge spout via the upper and lower auger portions.

When the unload operation is completed, the door to the sump 32 may be closed, the augers stopped, and the upper auger portion 36 folded from the operating position to the transport position. If the upper auger portion 36 was in a rotated orientation, the actuator 52 may be extended to cause the upper auger portion to rotate back to the unrotated position prior to being folded into the transport position.

From the above, it will be appreciated that a grain cart according to exemplary embodiments of the present invention may comprise a rolling frame, a bin mounted on the frame to hold an agricultural product such as grain, and a folding auger assembly having a folded position for transport and an unfolded operating position for discharging agricultural product from the bin, wherein the folding auger assembly is rotatable in the operating position to provide adjustable auger reach. In exemplary embodiments, the auger assembly includes a lower auger assembly or portion with a first longitudinal axis, and the auger assembly is rotatable about the first longitudinal axis. In addition, the auger assembly may include an upper auger assembly or portion with a second longitudinal axis that intersects the first longitudinal axis at an angle greater than zero (i.e., is tilted) when the auger assembly is in the operating position. In an embodiment, rotation of the auger assembly may be accomplished by mounting the lower auger assembly for rotation about its longitudinal axis on first and second rotation mounts and rotating the lower auger assembly by use of an actuator. In an embodiment, the actuator may be a hydraulic cylinder connected between the lower auger assembly and the frame and/or bin. In an embodiment the hydraulic cylinder may be oriented generally perpendicular to the longitudinal axis of the lower auger assembly. In an embodiment, the lower auger assembly includes upper and lower radial flanges or bands of circular configuration and the rotation mounts include circular rings with annular recesses or spaces that are configured to receive the upper and lower flanges. In an embodiment, roller bearings may be disposed within one or both of the annular recesses against the flanges or bands.

While one or more exemplary embodiments of the present invention have been shown and described, it will be appreciated that various modifications and changes can be made to the grain cart of the present invention. For example, a grain cart according to the present invention may include a rolling frame supported for movement by wheels with tires as shown or by other types of rolling members, such as track assemblies, alone or in combination with wheel and tire assemblies. By way of further example, any number of rotation mounts may be used, including a single mount, two mounts as shown, or more than two mounts. When more than one rotation mount is used, the rotation mounts may be the same or different. While rotation mounts with rings and/or roller bearings are shown and described, other types of rotation mounts can be used, such as members that ride in annular grooves formed in the auger assembly, members that engage all or part the outer circumference of the auger assembly, etc. Also, it will be appreciated by those of skill in the art that the upper auger assembly can be hinged as shown to fold rearwardly along a side of the grain cart for transport, or the hinge can be positioned to allow the upper auger portion to fold across a front of the grain cart for transport. In the folded or transport position, the upper auger can be oriented horizontally or angled upwardly or downwardly. For example, if the lower auger portion is rotated such that the pivot axis of the hinge assembly is oriented vertically, the upper auger portion can be made to fold into a horizontal storage position. The length of the upper auger portion can be such that it extends rearwardly beyond the rear wall of the bin or does not extend beyond the rear bin wall. Furthermore, while the discharge spout at the distal end of the upper auger assembly is shown in various positions when the auger assembly is or has been rotated, it will be appreciated that the discharge spout may be configured to be rotatable (e.g., by use of a chute actuator) about a longitudinal axis of the upper auger assembly and/or about an axis perpendicular to the longitudinal axis of the upper auger assembly, such that the position of the discharge spout may be adjusted when the auger assembly is or has been rotated. The discharge spout can be configured for manual and/or automatic repositioning. For example, the discharge spout can be configured for automatic repositioning by use of master and slave cylinders which are arranged such that the master cylinder is used to rotate the auger and the slave cylinder is used to rotate the discharge spout. In an exemplary embodiment, the hydraulic oil being discharged from the master cylinder can be used to actuate the slave cylinder that is connected to the discharge spout to control the position of the discharge spout (e.g., to maintain a desired orientation—such as a vertical orientation—of the spout relative to the ground). Another exemplary mechanism for automatically repositioning the discharge spout as the auger assembly is rotated may include a hydraulic valve using proportional valves that ratios the oil from the tractor to the different function cylinders (including a discharge spout position cylinder) to maintain the chute position relative to the ground. Also, while hydraulic cylinders are shown and/or described for folding the upper auger portion, rotating the auger assembly, and repositioning the discharge spout, any suitable actuators can be used, including for example electric, pneumatic, and/or hydraulic actuators. It will also be appreciated that the auger rotation actuator can be a linear actuator connected between the lower auger portion and another part of the grain cart (e.g., as shown at 52), or the rotary actuator can be a linear actuator that is part of a rack and pinion system (e.g., the linear actuator can be configured to move a rack with gear teeth such that it turns a pinion formed on or connected with the lower auger portion), or the rotary actuator can be motor with a rotating shaft that drives a gear assembly (e.g., via a spur gear on the shaft that engages gear teeth formed on or connected with the lower auger portion).

What is claimed is:
1. A grain cart, comprising:
 a rolling frame;
 a bin mounted to said frame and having one or more walls defining a space for storing an agricultural product; and
 a folding auger assembly having an upper auger portion with a first longitudinal axis and a lower auger portion with a second longitudinal axis, said upper auger portion further having an upper auger, an upper auger housing, and a discharge spout coupled to a top end of said upper auger housing, and said lower auger portion further having a lower auger and lower auger housing,
 wherein a bottom end of said lower auger housing is coupled to said bin and a top end of said lower auger housing is coupled to a bottom end of said upper auger housing, such that said lower auger and upper auger are operable to convey the agricultural product from said bin to said discharge spout,
 wherein said auger assembly is foldable about a folding axis between a stored position and an operating position, such that in said stored position, said upper auger portion is folded relative to said lower auger portion so that said upper auger portion extends along a length of a respective wall of said bin, and in said operating position, said upper auger portion extends upwardly from said lower auger portion, and wherein said auger assembly is rotatable in said operating position about said second longitudinal axis;

wherein at least one of said top end of said lower auger housing, relative to said second longitudinal axis, and said bottom end of said upper auger housing, relative to said first longitudinal axis, is orientated at an oblique angle when in said operating position.

2. The grain cart of claim 1, wherein said oblique angle is from 60° to 120°.

3. The grain cart of claim 1, wherein said oblique angle is from 80° to 85°.

4. The grain cart of claim 1, wherein said oblique angle is about 83°.

5. The grain cart of claim 1, wherein said first longitudinal axis is tilted relative to said second longitudinal axis, when in said operating position.

6. The grain cart of claim 5, wherein said upper auger portion is tilted laterally outward relative to said lower auger portion, when in said operating position.

7. The grain cart of claim 1, wherein rotating said auger assembly in said operating position about said second longitudinal axis is operable to cause said discharge spout to move along a circular path or arc with a radius equal to an angular offset of said discharge spout relative to said second longitudinal axis.

8. The grain cart of claim 1, wherein a reach of said discharge spout may be adjusted by rotating said auger assembly in said operating position about said second longitudinal axis.

9. The grain cart of claim 1, wherein an amount of a reach adjustment is at least one of 36 inches in a vertical direction, 18 inches in a lateral direction, and 12 inches in a forward direction.

10. The grain cart of claim 1, further comprising:
a first rotation mount coupled to said frame;
a second rotation mount coupled to said frame and spaced laterally from said first rotation mount along said second longitudinal axis; and
a rotational actuator for rotating said lower auger assembly coupled to said lower auger housing at one end and to a support member of said frame at another end,
wherein said rotational actuator is operable to cause said lower auger assembly to rotate in said operating position about said second longitudinal axis such that said first rotation mount and said second rotation mount remain fixed as said lower auger assembly rotates.

11. The grain cart of claim 10,
wherein said lower auger housing further includes a circular flange near said bottom end of said lower auger housing and protruding radially outward from and extending around said lower auger housing, and a circular band near said top end of said lower auger housing and protruding radially outward from and extending around said lower auger housing, and
wherein said circular flange is coupled to said first rotation mount and said circular band is coupled to said second rotation mount.

12. The grain cart of claim 11, wherein said second rotation mount includes a pair of spaced rings defining an annular space therebetween configured to receive said circular band, and wherein said pair of spaced rings is connected to at least one of said bin and said frame by said support member.

13. The grain cart of claim 10, wherein said rotational actuator is oriented generally perpendicular to said second longitudinal axis, and is connected between said lower auger housing and said support member, wherein said support member extends upwardly from said frame to said first rotation mount.

14. The grain cart of claim 1, wherein the auger assembly is rotatable about said second longitudinal axis between a plurality of positions in which said auger assembly is operable.

15. A method of using a grain cart to unload material into a receptacle, said method comprising:
providing a grain cart according to claim 1;
unfolding said auger assembly into said operating position, wherein said discharge spout is at a first location relative to said receptacle; and
rotating said auger assembly to adjust a reach of said upper auger portion to position said discharge spout at a second location relative to said receptacle different from said first location.

16. The grain cart of claim 1, wherein the one or more walls of said bin comprise a front wall, a rear wall, and two opposed sidewalls extending from the front wall to the rear wall.

17. The grain cart of claim 16, wherein the upper auger portion is set in said stored position, the upper auger portion extends along a length of one of the sidewalls.

18. The grain cart of claim 1, wherein the folding axis extends laterally across the top end of the lower housing.

19. The grain cart of claim 1, wherein the first longitudinal axis extends along an entire length of the upper auger housing, and the second longitudinal axis extends along an entire length of the lower auger housing.

* * * * *